United States Patent
Kraiss (10) Patent No.: US 7,567,950 B2
(45) Date of Patent: Jul. 28, 2009

(54) ANALYTICAL TASK EXECUTION

(75) Inventor: Achim Kraiss, Lautertal (DE)

(73) Assignee: SAP AG, Walldorf ( * ) Notice: Subject to any disclaimer, the term of this patent is extended or adjusted under 35 U.S.C. 154(b) by 276 days.

(21) Appl. No.: 10/757,315

(22) Filed: Jan. 14, 2004

(65) Prior Publication Data

US 2005/0154748 A1    Jul. 14, 2005

(51) Int. Cl.
*G06F 17/30*    (2006.01)
(52) U.S. Cl. ............................................. 707/2; 707/5
(58) Field of Classification Search ....................... None
See application file for complete search history.

(56) References Cited

U.S. PATENT DOCUMENTS

| | | | | |
|---|---|---|---|---|
| 6,236,978 | B1* | 5/2001 | Tuzhilin | 705/26 |
| 2006/0161814 | A1* | 7/2006 | Wocke et al. | 714/26 |

OTHER PUBLICATIONS http://www.sas.com/news/preleases/111802/news2.html—"SAS Acquires Technology to Track Customer Behavior In Real-Time," printed from the Internet Apr. 18, 2003, 2 ps.

"Welcome to The Real-Time Enterprise," *PeopleSoft, Inc.*, Copyright 2003, 8 ps.
"DataDistilleries Real-Time Suite," *DataDistilleries*, Copyright 2002, 2 ps.
"DataDistilleries Analytical Suite," *DataDistilleries*, Copyright 2002, 2 ps.
http://www.epiphany.com/news/2002press/2002_08_27.html—E. Piphany—"E.Piphany Real-Time Wins CRM Excellence Award from Customer Inter@ction Solutions Magazine," printed from the Internet Apr. 18, 2003, 2 ps.
http://www.verilytics.com/products/index.html—"Verilytics Products," printed from the Internet Apr. 18, 2003, 2 ps.
http://www.dmg.org/faq.htm—"Frequently Asked Questions," printed from the Internet Apr. 18, 2003, 2 ps.
PowerPoint Presentation, Analytical CRM, *SAP AG*, 24 ps.

* cited by examiner

*Primary Examiner*—Yicun Wu
(74) *Attorney, Agent, or Firm*—Fish & Richardson P.C.

(57) ABSTRACT

One embodiment of the invention provides a computer system that is operable to invoke multiple executions of an analytical task in response to receiving a request for analytical information from a front-end software application. In this embodiment, the computer system is programmed to use the request to identify a first input value, and invoke a first execution of the analytical task by providing the first input value to a first analytical engine. The computer system is further programmed to identify a second input value, and invoke a second execution of the analytical task by providing both the first and second input values to a second analytical engine.

16 Claims, 4 Drawing Sheets

ANALYTICAL TASK EXECUTION

TECHNICAL FIELD

This invention relates to analytical task execution in computing systems.

BACKGROUND

In a typical real-time analytics system, various front-end software applications provide customer transaction data directly to an analytical engine that is capable of executing analytical tasks. An example of such an analytical engine is a prediction engine that provides useful, predictive output relating to a transaction with a customer. An analytical engine is capable of processing real-time data from a customer to execute analytical tasks and to generate output in real time. Often, the analytical engine will use the real-time data in coordination with a data mining model to generate a predictive output. A data mining model typically contains rules and patterns derived from historical data that has been collected, synthesized, and formatted.

In many instances, a predictive output generated upon execution of an analytical task is fed into a business rule engine. The business rule engine will use the predictive output in conjunction with its rule set to determine if certain events should be triggered in a given front-end software application. For example, the business rule engine may determine that a special promotional offer should be provided to a particular customer given the content of the predictive output and the nature of the transaction with that customer. In some instances, the front-end software applications may directly process the predictive output.

Typically, front-end software applications will need predictive output in a short period of time. For example, if a call-center agent is using a front-end software application to interact with a customer online, the agent will typically need predictive output fairly quickly in order to interact with the customer in an efficient fashion. If the front-end application has not received any predictive output after a specified period of time, due to performance delays or other issues on a prediction engine, the application can choose either to continue waiting, or to proceed in the customer interaction without any predictive output. If the front-end application chooses to wait, the quality of the customer interaction may be compromised, because the call-center agent may not be able to respond as quickly to the customer's requests. If the front-end application chooses to proceed without having received any predictive output, the quality of the customer interaction may also be compromised, because the call-center agent may not have sufficient information to proceed intelligently with the customer interaction.

SUMMARY

Various embodiments of the present invention are described herein. One embodiment of the invention provides a computer system that is operable to invoke multiple executions of an analytical task in response to receiving a request for analytical information from a front-end software application. In this embodiment, the computer system is programmed to use the request to identify a first input value, and invoke a first execution of the analytical task by providing the first input value to a first analytical engine. The computer system is further programmed to identify a second input value, and invoke a second execution of the analytical task by providing both the first and second input values to a second analytical engine.

Various embodiments of the present invention may have certain benefits and advantages. For example, a computer system is capable of incrementally and asynchronously executing analytical tasks. After each execution, the computer system provides task output information to a front-end software application that can then choose whether it will immediately process the output information or instead wait for additional task output information that may be of higher quality. In certain situations, the front-end software application may require task output information very quickly, and may not be as concerned with the quality of the information. In other situations, however, the front-end software application may require high-quality output information, and is willing to wait longer to receive such information.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
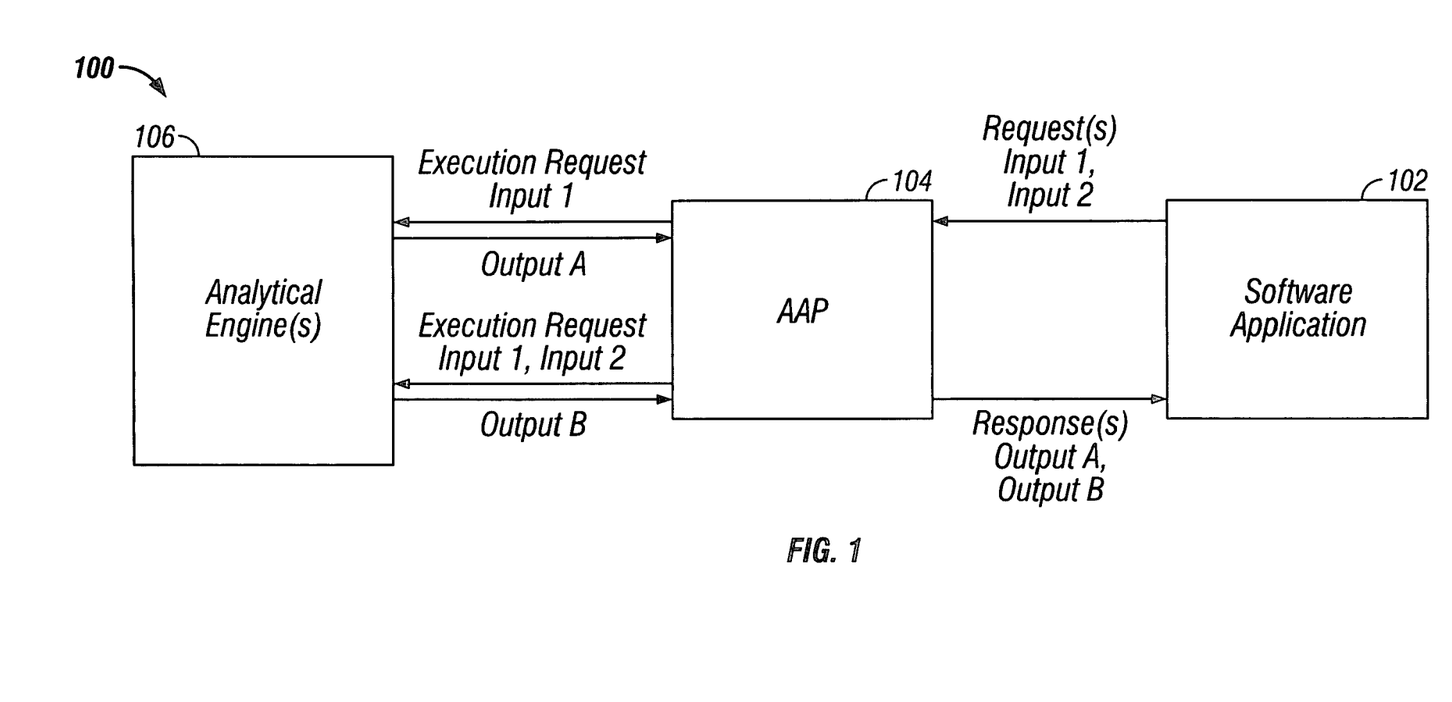
FIG. 1 is a block diagram of a system used to execute analytical tasks, according to one embodiment of the invention.

FIG. 1 is a block diagram of a system 100 used to execute analytical tasks. The system 100 includes a front-end software application 102, an Analytical Application Provider (AAP) 104, and a set of analytical engines 106. In one embodiment, the AAP 104 is a computer system. The AAP 104 receives a request for analytical information from the front-end software application 102 to execute an analytical task, such as a prediction task. The AAP 104 uses the request to identify a first input value "Input 1." The AAP 104 then invokes a first execution of the analytical task by providing the first input value "Input 1" to the one of the analytical engines from the set 106. Subsequently, the AAP 104 is capable of identifying a second input value "Input 2" and invoking a second execution of the analytical task by providing both the first input value "Input 1" and the second input value "Input 2" to one of the analytical engines from the set 106. In this fashion, the AAP 104 is capable of incrementally and asynchronously invoking execution of analytical tasks.

In one embodiment, the set of analytical engines 106 generates task output information upon execution of the analytical tasks, and sends this output information back to the AAP 104. For example, one of the analytical engines from the set 106 generates the output value "Output A" after performing the first execution of the analytical task. One of the analytical engines from the set 106 also generates the output value "Output B" after performing the second execution of the analytical task. These output values "Output A" and "Output B" are sent back to the AAP 104, which is then capable of automatically forwarding this output information back to the software application 102. In one embodiment, the software application 102 is a call-center application. The AAP 104 will generally forward output information to the software application 102 as soon as it is available. Therefore, if the AAP 104 first receives the output value "Output A" and then later receives the output value "Output B," the AAP 104 will forward these values to the software application 102 in the same order in which they were received.

In the example shown in FIG. 1, the AAP 104 is capable of identifying both the first input value "Input 1" and the second input value "Input 2" from the incoming requests received from the software application 102. In one embodiment, the input values "Input 1" and "Input 2" are included within a single incoming request from the software application 102. In another embodiment, the input values "Input 1" and "Input 2" are included within different incoming requests from the software application 102. For example, the software application 102 may send a first request to the AAP 104 that includes the input value "Input 1," and then later send a second request to the AAP 104 that includes the input value "Input 2."

In one embodiment, the set of analytical engines 106 is located externally from the AAP 104. In one embodiment, the set of analytical engines 106 includes only one analytical engine. In another embodiment, the set of analytical engines 106 includes at least two analytical engines. In this embodiment, the AAP 104 is capable of invoking executions of analytical tasks in parallel using the distinct analytical engines. For example, the AAP 104 may send the first execution request that includes "Input 1" to a first analytical engine. When the AAP 104 obtains "Input 2" from the software application 102, it may decide whether to send the second execute request that includes "Input 1" and "Input 2" to the first analytical engine or a second analytical engine. If the first analytical engine has already returned "Output A" when the AAP 104 receives "Input 2", the AAP 104 may decide to send the second execution request to the first analytical engine. However, it the first analytical engine has not yet returned the value of "Output A" in response to the first execution request, the AAP 104 may instead decide to send the second execution request to the second analytical engine. In this fashion, the first and second analytical engines could process the first and second execution requests in parallel. When this occurs, the ordering of "Output A" and "Output B" may be arbitrary. If the second analytical engine, for instance, is faster than the first analytical engine, "Output B" may be returned to the AAP 104 earlier than "Output A." In this case, the AAP 104 may choose to ignore "Output A".

In one embodiment, the functionality of the AAP 104 is embodied in hardware. In another embodiment, the functionality of the AAP 104 is embodied in software. In this embodiment, the software may be stored on a computer-readable medium, such as CD-ROM, floppy disk, or other storage mechanism. In another embodiment, the functionality of the AAP 104 is embodied in a combination of hardware and software.

The system 100 shown in FIG. 1 may provide many functional advantages. For example, the AAP 104 is capable of incrementally and asynchronously invoking execution of analytical tasks on the set of analytical engines 106 as the AAP 104 receives additional input information from the software application 102. For example, the AAP 104 may only initially receive the input value "Input 1" from the software application 102. The AAP 104 is capable of invoking a first execution of an analytical task by providing this value to one of the analytical engines from the set 106, and then sending the generated output value "Output A" back to the software application 102. When the AAP 104 later receives the input value "Input 2" from the software application 102, it is capable of invoking a second execution of the analytical task by providing both of the input values "Input 1" and "Input 2" to one of the analytical engines from the set 106, and then sending the generated output value "Output B" back to the software application 102.

Figure 2:
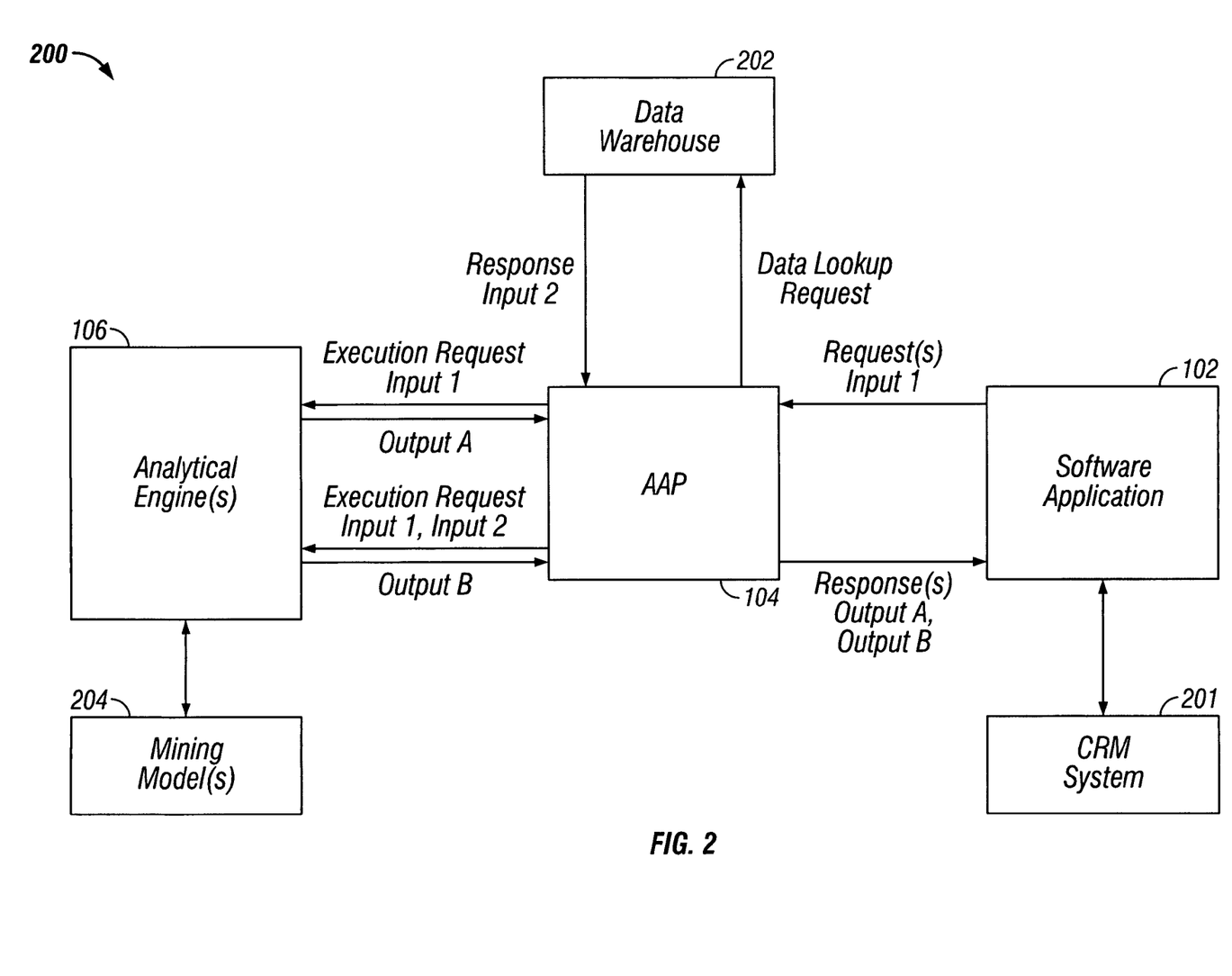
FIG. 2 is a block diagram of a system used to execute analytical tasks, according to another embodiment of the invention.

FIG. 2 is a block diagram of a system 200 to execute analytical tasks, according to another embodiment of the invention. The system 200 includes various components that were also shown in FIG. 1, such as the software application 102, the AAP 104, and the set of analytical engines 106. The system 200 further includes a set of data mining models 204, a data warehouse 202, and a Customer Relationship Management (CRM) system 201. The set of analytical engines 106 uses the set of mining models 204 during execution of analytical tasks. The AAP 104 is capable of utilizing input information provided by the software application 102 and by the data warehouse to invoke execution of these analytical tasks on the set of analytical engines 106. In one embodiment, the set of mining models 204 includes only one model. In this embodiment, the set of analytical engines 106 all use this model. In another embodiment, the set of mining models 204 includes at least two models. These models, however, may be duplicates of each other. For example, each analytical engine in the set 106 may have access to a distinct model from the set 204, but each distinct model may be a duplicate of the others in the set 204.

In the system 200 shown in FIG. 2, the software application 102 obtains input information from the CRM system 201. The CRM system 201 is capable of providing various sorts of information about customers, such as a customer's income. The information stored in the CRM system 201 is based upon data collected from prior transactions with customers. The software application 102 then includes this input information in a request that is sent to the AAP 104 for execution of an analytical task. In the example shown in FIG. 2, the software application 102 sends an input value "Input 1" to the AAP 104.

Upon receiving this request, the AAP 104 is then capable of invoking a first execution of an analytical task, such as a prediction task, on one of the analytical engines from the set 106. To do so, the AAP 104 sends a first execution request to this analytical engine. The AAP 104 is capable of doing so in an asynchronous fashion. That is, the AAP 104 can send this first execution request while the software application 102 continues to operate and potentially collects additional input information. This first execution request includes the input value "Input 1." The analytical engine uses one of the data mining models from the set 204 to perform the first execution of the analytical task, and sends the output value "Output A" back to the AAP 104. The AAP 104 is then able to send a first response that includes the output value "Output A" back to the software application 102.

The AAP 104, however, is further capable of invoking a second, subsequent execution of the analytical task when it obtains additional input information. For example, as shown in FIG. 2, the AAP 104 sends a data lookup request to the data warehouse 202 to obtain the input value "Input 2." In one scenario, the data warehouse 202 may contain various Key Performance Indicator (KPI) data, such as the number of customer purchases or complaints. Typically, KPI data will include aggregated data for one or more customers. In this type of scenario, the AAP 104 obtains additional input information by sending KPI-lookup requests to the data warehouse 202.

After obtaining the input value "Input 2," the AAP 104 sends a second execution request to one of the analytical engines from the set 106. This second execution request includes the input values "Input 1" and "Input 2." The analytical engine again uses one of the data mining models from the set 204 to perform the second execution of the analytical task, and sends the output value "Output B" back to the AAP 104. The AAP 104 is then able to send a second response that includes the output value "Output B" back to the software application 102.

In one embodiment, the AAP 104 is capable of using additional information contained within the requests received from the software application 102 to identify the specific mining model from the set 204 and analytical engine from the set 106 that are to be used when executing the analytical tasks. In this embodiment, the AAP 104 identifies a task name within individual requests from the software application 102 to identify the particular model and engine that are to be used.

The system 200 shown in FIG. 2 may provide many functional advantages. For example, the AAP 104 is capable of incrementally invoking execution of analytical tasks as it asynchronously obtains additional input information. This input information may be provided by the software application 102 or by the data warehouse 202 via lookup requests. The AAP 104 is also capable of providing output information generated upon execution of these tasks back to the software application 102. The software application 102 is then capable of determining whether to process the current output information or to instead wait for subsequent output information from the AAP 104. This particular advantage is further expanded upon in the flow diagram shown in FIG. 3.

Figure 3:
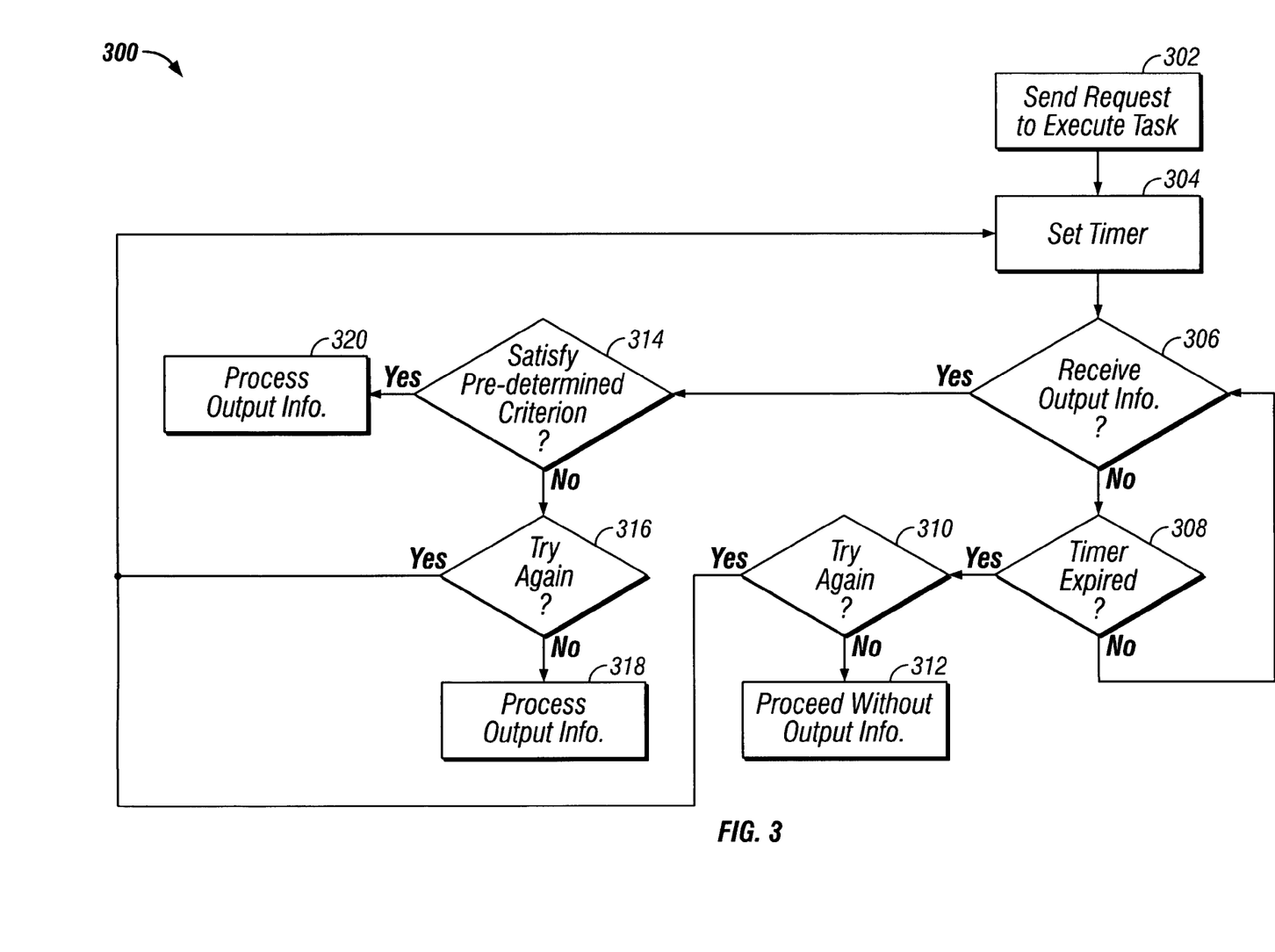
FIG. 3 is a flow diagram of a computer-implemented method on a front-end software application, according to one embodiment of the invention.

FIG. 3 is a flow diagram of a computer-implemented method 300 for processing analytical information, according to one embodiment of the invention. In one embodiment, the method 300 is performed by the software application 102 shown in FIG. 1 and FIG. 2. By performing the method 300, the software application 102 can determine whether it will use initial task output information that it obtains, or whether it will instead wait a longer period of time for additional, and potentially higher-quality, task output information.

The method 300 shown in FIG. 3 includes method elements 302, 304, 312, 318, and 320, and also checkpoints 306, 308, 310, 314, and 316. In the method element 302, the software application 102 sends a request to execute an analytical task. The software application 102 sends this request to the AAP 104. In the method element 304, the software application 102 sets a timer for a predetermined amount of time. Typically, a user using the software application 102 hopes to receive task output information in a short period of time. For example, a call-center agent interacting with a customer may want to obtain predictive output to determine how to best continue the interaction with the customer. In order for the agent to interact with the customer quickly in real time, the agent will typically want to obtain this predictive output in an efficient manner. As such, the software application 102 will set a timer in the method element 304 for a predetermined amount of time that corresponds to a maximum wait time.

At the checkpoint 306, the software application 102 will determine whether it has received any task output information that corresponds to the task request that it had previously sent in the method element 302. If the software application 102 has received output information, then it will determine whether the output information satisfied a predetermined criterion at the checkpoint 314. If the software application 102 has not yet received any output information, then it will check to determine whether the timer (for the maximum wait time) has expired. If the timer has not yet expired, then the software application 102 will again check to determine if it has received any task output information in the method element 306. The software application 102 will continue to check for output information in this fashion until either it has received output information or until the timer has expired.

If the timer has expired, the software application 102 will check to determine whether it will try again to receive output information at the checkpoint 310. This determination will be based on whether the software application 102 decides to continue waiting for task output information or to simply continue in its operations without having any output information. In certain scenarios, the software application 102 may be unable to wait any longer for predictive output information, and may therefore decide to proceed in its operations without having obtained any of such information in the method element 312. However, in many situations, the software application 102 will determine that it is able to wait additional time to obtain predictive output information. In this case, the software application 102 will again set a wait timer for a predetermined amount of time in the method element 304 and again wait for output information.

If the software application 102 does receive task output information, it will check to determine whether this information satisfies a predetermined criterion at the checkpoint 314. In one embodiment, the software application 102 determines if the received output information satisfies a predetermined quality-rating or confidence-rating criterion at the checkpoint 314. A predetermined quality rating relates to a quantitative measurement of the quality of the output information. For example, the predetermined quality rating could be High, Medium, or Low. In this example, the software application 102 could determine whether the output information satisfies a predetermined quality rating of Medium. A predetermined confidence rating relates to a quantitative measurement of the confidence in the value of the output information. For example, the predetermined confidence rating could be 25%, 50%, or 75%. In this example, the software application 102 could determine whether the output information satisfies a predetermined confidence rating of 50%.

If the output information satisfies the predetermined criterion, then the software application 102 will process the output information in the method element 320. For example, the software application 102 could further analyze the output information or prepare this information for display to a user, such as a call-center agent. If the output information does not satisfy the predetermined criterion, then the software application 102 will determine whether it should try again to obtain additional output information at the checkpoint 316. If the software application 102 decides to try again, it will set another timer in the method element 304 and wait for additional output information. Otherwise, the software application 102 will process the output information that it has received at the method element 318.

By using the method 300 shown in FIG. 3, the software application 102 is able to take advantage of the ability of the AAP 104 to asynchronously invoke incremental executions of an analytical task. After receiving output information generated from a first execution of the task, the software application 102 can decide whether to immediately process that information if it is needed quickly, or to instead wait for additional output information that may be of a higher quality. An individual who uses the software application 102, such as a call-center agent, may make this decision. The software application 102 may also be capable of automatically making this decision without user input by using predefined rules. In certain cases, the software application 102 may have the most need for quickly generated output information. Such information may suffice under certain circumstances. In other cases, the software application 102 may require high-quality or high-confidence output information. By performing the method 300, the software application 102 can make the best use of the output information as it is received according to its current needs.

Figure 4:
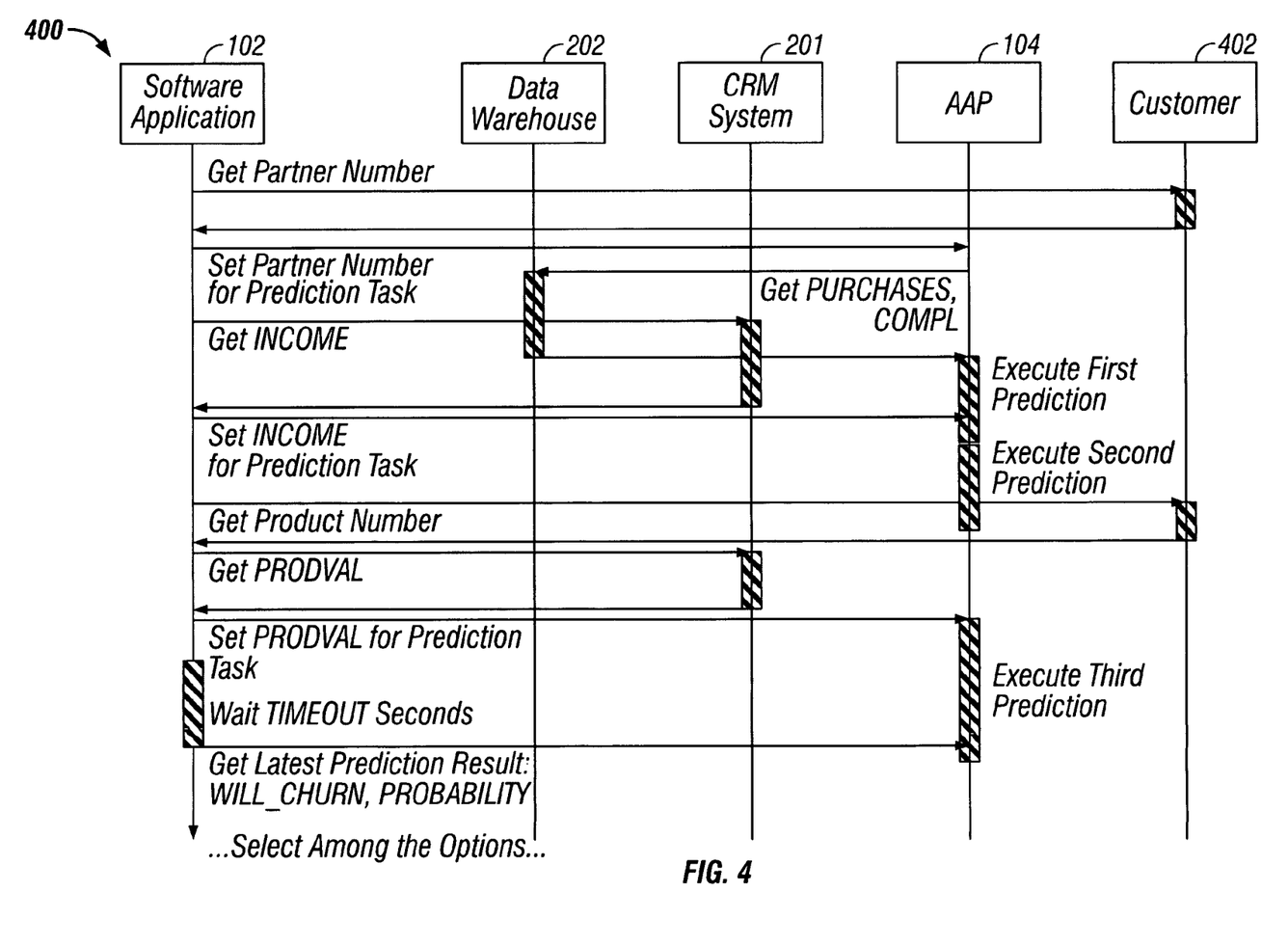
FIG. 4 is a use-case diagram of a computer-implemented method for processing analytical information, according to one embodiment of the invention.

FIG. 4 is a use-case diagram 400 of a computer-implemented method for processing analytical information, according to one embodiment of the invention. The use-case diagram 400 includes various actors that are also shown in FIG. 2. The software application 102, the data warehouse 202, the CRM system 201, the AAP 104, and a customer 402 are each included within the use-case diagram 400. These actors interact to provide incremental and asynchronous task execution functionality.

In the use-case diagram 400, a call-center example is provided, wherein a call-center agent uses the software application 102 when interacting with the customer 402. In this example, the customer 402 has called in to complain about a damaged product. The call-center agent may work on behalf of the product manufacturer. Using the software application 102, the agent may have the following two options in responding to the customer. (1) The agent can ask the customer to send the damaged product, at the customer's expense, back to the manufacturer. With this option, a replacement can be sent back to the customer once the damaged product is received. (2) The agent can ask the customer to send the damaged product back to the manufacturer at the manufacturer's expense. With this option, a replacement can be immediately sent to the customer without waiting for the shipment of the damaged product. The manufacturer may want to offer option (1) to non-profitable customers who are unlikely to churn (i.e., switch to another provider or manufacturer). The manufacturer may want to offer option (2) to profitable customers who are more likely to churn. To best determine whether to offer option (1) or (2), the call-center agent would like to obtain information relating to the profitability of the customer, and a prediction relating to the probability of customer churn. In most cases, the agent would like to obtain this information quickly to best interact with the customer, who may be waiting on the phone. However, the agent may also want to obtain a prediction for the probability of customer churn with a certain level of prediction confidence. The use-case diagram 400 of FIG. 4 illustrates the functionality of incremental prediction task execution to provide churn probability information that can be used by the call-center agent in this type of scenario.

To start the use case, the complaining customer 402 calls into the call-center. The agent using the software application 102 asks the customer 402 for the customer partner number, which is the unique number associated with the customer 402. The customer 402 provides the partner number back to the agent using the software application 102. The software application 102 then sends the partner number to the AAP 104.

Before executing a first prediction task, the AAP 104 determines that it should first access the data warehouse 202 to obtain values for PURCHASES and COMPL by using the customer partner number. In the example shown in FIG. 4, the AAP 104 initiates a key performance indicator (KPI) lookup task to obtain the values for PURCHASES and COMPL from the data warehouse 202. The value of PURCHASES is the number of total purchases by the customer 402 in the last three years. The value of COMPL is the number of previous complaints by the customer 402.

Before the data warehouse 202 has provided the values for PURCHASES and COMPL back to the AAP 104, the software application 102 sends a request to the CRM system 201 for a value of INCOME, which corresponds to the income of the customer 402. The CRM system 201 stores this information in customer master data. The CRM system 201 sends the values of INCOME back to the software application 102 after the AAP 104 has received the values for PURCHASES and COMPL from the data warehouse 202.

Once the AAP 104 has received the values for PURCHASES and COMPL, it can use these values as input for executing a first prediction task. This task can be executed using only the values of PURCHASES and COMPL. Before this task has finished executing, the software application 102 sends the value of INCOME to the AAP 104. In one embodiment, the AAP 104 automatically sends output generated upon execution of the first task back to the software application 102. After the AAP 104 has received the value of INCOME, it can use the values of PURCHASES, COMPL, and INCOME as input for executing a second prediction task. Before this task has finished executing, the agent using the software application 102 asks the customer 402 for the product number. In one embodiment, the AAP 104 automatically sends output generated upon execution of the second task back to the software application 102.

After the second prediction task has finished executing, the customer 402 provides the product number to the agent using the software application 102. The software application 102 then uses the product number to get a value of PRODVAL from the CRM system 201. The value of PRODVAL is the value of the product associated with the product number provided by the customer 402. The CRM system 201 uses transactional sales data for the customer 402 to provide the value of PRODVAL back to the software application 102.

The software application 102 then sends the value of PRODVAL to the AAP 104, and waits a period of time for a response. In the example shown in FIG. 4, the software application waits TIMEOUT number of seconds. After receiving the value of PRODVAL, the AAP 104 uses the values of PURCHASES, COMPL, INCOME, and PRODVAL to execute a third prediction task. In one embodiment, the AAP 104 automatically sends output generated upon execution of the third task back to the software application 102.

The execution of the first, second, and third prediction tasks each generates predictive output that can be provided to the software application 102. In the example shown in FIG. 4, this predictive output includes the values WILL_CHURN and PROBABILITY. The value of WILL_CHURN indicates whether the customer will or will not churn, according to the predictive output. The value of PROBABILITY indicates the probability that the customer will or will not churn. Because the first prediction task uses only the values of PURCHASES and COMPL as input, the predictive output will potentially be of lower quality, or have lower confidence, than the predictive output generated from the execution of the second and third prediction tasks, which are based on a larger set of input values. For example, the first prediction task could generate the output values "WILL_CHURN=yes" and "PROBABILITY=60%". The second prediction task could generate the output values "WILL_CHURN=yes" and "PROBABILITY=75%". The third prediction task could generate the output values "WILL_CHURN=yes" and "PROBABILITY=90%".

To interact with the customer 402, the agent using the software application 102 will want to be able to use the predictive output from one of these three prediction tasks to determine the type of offering that should be made to the customer 402. In certain instances, the agent will want predictive output that can be provided quickly, even if it is of lower quality. In other instances, the agent will want high-quality predictive output. The use-case 400 provides the agent using the software application 102 with a great deal of flexibility in this regard.

For example, after the software application 102 has waited TIMEOUT seconds, it can determine whether it has received predictive output from the execution of the first, second, and/or third prediction tasks. If the software application 102 has only received predictive output from the first prediction task, it can decide whether to use this output for its decision-making, or whether instead to wait an additional period of time to receive predictive output from the second and/or third prediction tasks. If, for example, the software application 102 only needs to know that the customer 402 will churn with a probability of 50%, then the predictive output "WILL_CHURN=yes" and "PROBABILITY=60%" that may be generated from the first task would be sufficient. If, on the other hand, the software application 102 needs to know that the customer 402 will churn with a probability of 90%, then it may want to wait an additional period of time to receive the predictive output "WILL_CHURN=yes" and "PROBABILITY=90%" that may be generated from the third task.

As such, the use-case 400 shown in FIG. 4 provides the software application 102 with a great deal of flexibility. Because prediction tasks can be executed in an incremental and asynchronous fashion, the software application 102 can decide whether to quickly process initial predictive output, or to instead wait a longer period of time to process predictive output of a higher quality. In many instances, the software application 102 may be able to make immediate use of quickly-generated predictive output, while in other instances, it is able to wait for higher-quality predictive output that is generated from a larger set of input parameters.

A number of embodiments of the invention have been described. Nevertheless, it will be understood that various modifications may be made without departing from the spirit and scope of the invention. Accordingly, other embodiments are within the scope of the following claims.

What is claimed is:

1. A computer system to invoke multiple executions of an analytical task and provide an analytical output in response, comprising:
   a first analytical engine;
   a second analytical engine; and
   a processing module, programmed to:
      receive a request for analytical information from a front-end software application, the analytical information to indicate a likelihood of an event occurrence with regard to an identified entity, the analytical information to be determined using any of multiple information values associated with the identified entity;
      receive at least one first information value of the multiple information values;
      invoke a first execution of the analytical task by providing the at least one first information value to the first analytical engine, wherein at least one second information value of the multiple information values has not yet been received by the processing module when the first execution is invoked;
      receive, the at least one second information value after invoking the first execution;
      invoke a second execution of the analytical task by providing the at least one first and the at least one second information values to the second analytical engine; and
      provide an output to the front-end software application in response to the request, the output indicating the likelihood of the event occurrence determined using a result from at least one of the first and second executions of the analytical task.

2. The computer system of claim 1, wherein the first analytical engine and the second analytical engine are located externally from the processing module.

3. The computer system of claim 1, wherein the first analytical engine and the second analytical engine are the same analytical engine.

4. The computer system of claim 1, wherein the request includes the first information value.

5. The computer system of claim 1, wherein the processing module is programmed to obtain the at least one first information value by invoking an execution of an additional analytical task.

6. The computer system of claim 1, wherein the processing module is programmed to obtain the at least one second information value by invoking an execution of an additional analytical task.

7. The computer system of claim 1, wherein the processing module is programmed to obtain the at least one second information value from an additional request that is received from the front-end software application.

8. The computer system of claim 1, wherein the analytical task is a prediction task, and wherein the first and second analytical engines are prediction engines.

9. The computer system of claim 8, wherein the processing module is programmed to use the request to identify the first and second prediction engines.

10. The computer system of claim 9, wherein the processing module is programmed to:
   invoke the first execution of the prediction task on the first prediction engine by providing the at least one first information value as input into a first data mining model; and
   invoke the second execution of the prediction task on the second prediction engine by providing the at least one first information value and the at least one second information value as input into a second data mining model.

11. The computer system of claim 10, wherein the first and second data mining models are a common data mining model, and wherein the first and second data mining models are used by the first and second prediction engines during task execution.

12. The computer system of claim 1, wherein the processing module is programmed to automatically send output information generated from the first execution of the analytical task back to the front-end software application.

13. The computer system of claim 1, wherein the processing module is programmed to automatically send output information generated from the second execution of the analytical task back to the front-end software application.

14. The computer system of claim 1, wherein the second execution of the analytical task is invoked before the first execution of the analytical task finishes.

15. A computer-implemented method to invoke multiple executions of an analytical task and provide an output in response, the method comprising:
   receiving a request for analytical information from a front-end software application, the analytical information to indicate a likelihood of an event occurrence with regard to an identified entity, the analytical information to be determined using any of multiple information values associated with the identified entity;
   receiving the at least one first information value of the multiple information values;
   invoking a first execution of the analytical task by providing the at least one first information value to a first analytical engine, wherein at least one second information value of the multiple information values has not yet been received when the first execution is invoked;

receiving the at least one second information value after invoking the first execution;

invoking a second execution of the analytical task by providing the at least one first and the at least one second information values to a second analytical engine; and providing an output to the front-end software application in response to the request, the output indicating the likelihood of the event occurrence determined using a result from at least one of the first and second executions of the analytical task.

16. A computer-readable medium having computer-executable instructions contained therein to perform a method, the method comprising:

receiving a request for analytical information from a front-end software application, the analytical information to indicate a likelihood of an event occurrence with regard to an identified entity, the analytical information to be determined using any of multiple information values as associated with the identified entity;

receiving at least one first information value of the multiple information values;

invoking a first execution of the analytical task by providing the at least one first information value to a first analytical engine, wherein at least one second information value of the multiple information values has not yet been received when the first execution is invoked;

receiving the at least one second information value after invoking the first execution;

invoking a second execution of the analytical task by providing the at least one first and the at least one second information values to a second analytical engine; and providing an output to the front-end software application in response to the request, the output indicating the likelihood of the event occurrence determined using a result from at least one of the first and second executions of the analytical task.

\* \* \* \* \*